US012768774B2

(12) United States Patent
Sao et al.

(10) Patent No.: US 12,768,774 B2
(45) Date of Patent: Oct. 20, 2026

(54) BIOLOGICAL SAMPLE MEASURING DEVICE

(71) Applicant: HITACHI HIGH-TECH CORPORATION, Tokyo (JP)

(72) Inventors: Mayu Sao, Tokyo (JP); Tomoto Kawamura, Tokyo (JP); Masahito Kakuno, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 176 days.

(21) Appl. No.: 18/698,829

(22) PCT Filed: Sep. 22, 2022

(86) PCT No.: PCT/JP2022/035467
§ 371 (c)(1),
(2) Date: Apr. 5, 2024

(87) PCT Pub. No.: WO2023/079855
PCT Pub. Date: May 11, 2023

(65) Prior Publication Data

US 2024/0410821 A1 Dec. 12, 2024

(30) Foreign Application Priority Data

Nov. 8, 2021 (JP) ................................ 2021-181601

(51) Int. Cl.
*G01N 21/27* (2006.01)

(52) U.S. Cl.
CPC .................................. *G01N 21/27* (2013.01)

(58) Field of Classification Search
CPC .. G01N 33/48; G01N 21/3577; G01N 21/314; G01N 21/27; G01N 2201/0642; G01N 2035/00752
See application file for complete search history.

(56) References Cited

U.S. PATENT DOCUMENTS 6,609,946 B1 * 8/2003 Tran ..................... B24B 37/042 451/41
2005/0083451 A1 * 4/2005 Gurevich .......... G02F 1/133528 349/98
(Continued)

FOREIGN PATENT DOCUMENTS

JP 2004-037322 A 2/2004
JP 2011-247635 A 12/2011
(Continued)

OTHER PUBLICATIONS

Kirubanandan Shanmugam, "Engineering surface roughness of nanocellulose film via spraying to produce smooth substrates", 2019 (Year: 2019).*
(Continued)

*Primary Examiner* — Maurice C Smith
(74) *Attorney, Agent, or Firm* — MATTINGLY & MALUR, PC

(57) ABSTRACT

An object of the present disclosure is to provide a technique in which, when measuring a biological sample stored in a container to which a label is attached and separated into a plurality of component regions, a target portion that is a measurement target can be accurately specified without using a large-sized imaging mechanism. In a biological sample measuring device according to the present disclosure, a mirror is disposed on an optical path from a surface light source to an area camera, so that light transmitted through a biological sample is guided into the area camera while being refracted, and a light-absorbing material is disposed at a position where reflected light reflected and returned toward the biological sample is blocked (see FIG. 1).

13 Claims, 12 Drawing Sheets

(56) References Cited

U.S. PATENT DOCUMENTS

| | | | |
|---|---|---|---|
| 2011/0226045 | A1 | 9/2011 | Mcquillan |
| 2011/0255090 | A1 | 10/2011 | Harada et al. |
| 2012/0013889 | A1 | 1/2012 | Heise |
| 2020/0151870 | A1 | 5/2020 | Drechsler |

FOREIGN PATENT DOCUMENTS

| | | | | |
|---|---|---|---|---|
| JP | 2015-143720 | A | 8/2015 | |
| WO | WO-0224412 | A1 * | 3/2002 | ............. B24B 49/04 |

OTHER PUBLICATIONS

Japanese Office Action received in corresponding Japanese Application No. 2021-181601 dated Apr. 8, 2025.
International Search Report of PCT/JP2022/035467 dated Nov. 8, 2022.
Japanese Office Action received in corresponding Japanese Application No. 2021-181601 dated Sep. 9, 2025.

* cited by examiner

BIOLOGICAL SAMPLE MEASURING DEVICE

TECHNICAL FIELD

The present disclosure relates to a device that measures a biological sample separated into a plurality of component regions.

BACKGROUND ART

For the purpose of improving efficiency of clinical tests such as blood tests, there is a demand for a technique for automating a related-art liquid amount checking operation of a biological specimen before opening (before dispensing) performed by visual checking. Particularly, a biological sample such as a blood specimen before dispensing is separated into a plurality of layers by centrifugal separation or the like, and a technique for measuring only a liquid amount of a sample that is an analysis target is required. Further, since a barcode label for identification or a pre-label attached to a blood collection tube and shipped may be attached to the biological sample before dispensing, there is a demand for a technique capable of performing measurement in a state where the labels are attached.

As such a biological sample measuring device, for example, Patent Literature 1 discloses a technique in which pulsed light having two wavelengths is radiated by performing switching in a time-division manner to a sample separated into a plurality of layers, and transmitted light is measured while scanning the sample in a vertical direction, thereby detecting a height of a predetermined region of the sample separated into the plurality of layers.

Patent Literature 2 discloses a liquid detection device in which infrared light is applied to a specimen to detect transmitted light by a line sensor, a boundary of a label is obtained based on a first-order differential value thereof, and a serum amount of the specimen is measured. Further, in Patent Literature 2, a signal of the transmitted light is acquired by changing a light amount, so that analysis can be performed regardless of presence or absence of attenuation of the transmitted light due to the label.

CITATION LIST

Patent Literature

PTL 1: US2012/0013889
PTL 2: JP2004-037322A

SUMMARY OF INVENTION

Technical Problem

The technique disclosed in Patent Literature 1 relates to a liquid amount measurement technique in which, for the biological sample including the plurality of components, a boundary of a measurement target region is accurately specified to measure a liquid amount based on signals of the transmitted light having two wavelengths with different absorptances for a measurement target. However, in Patent Literature 1, it is necessary to perform measurement while vertically scanning a specimen (blood collection tube) in a longitudinal direction, and there is a problem that it is difficult to miniaturize the device due to a scanning mechanism.

In the technique disclosed in Patent Literature 2, an upper surface and a lower surface of serum are detected to measure a serum amount by signal processing based on differentiation from a signal of transmitted infrared light. However, when infrared rays are absorbed or scattered by characters printed on a blood collection tube, a blood cell component in a separating agent, color characters on a label, and the like, and the transmitted light is attenuated, there is a problem that it is difficult to separate the noises from a boundary of the serum, and accuracy of specifying the boundary of the serum and measuring a liquid amount may decrease.

The present disclosure has been made in view of the problem described above, and an object thereof is to provide a technique in which, when measuring a biological sample stored in a container to which a label is attached and separated into a plurality of component regions, a target portion that is a measurement target can be accurately specified without using a large-sized imaging mechanism.

Solution to Problem

In a biological sample measuring device according to the present disclosure, a mirror is disposed on an optical path from a surface light source to an area camera, so that light transmitted through a biological sample is guided into the area camera while being refracted, and a light-absorbing material is disposed at a position where reflected light reflected and returned toward the biological sample is blocked.

Advantageous Effects of Invention

According to a biological sample measuring device of the present disclosure, it is possible to accurately specify a target portion that is a measurement target without using a large-sized imaging mechanism when measuring a biological sample stored in a container to which a label is attached and separated into a plurality of component regions.

DESCRIPTION OF EMBODIMENTS

Embodiment 1

A biological sample to be measured in Embodiment 1 of the present disclosure is a specimen to which a pre-opening (pre-analysis) label is attached, and is assumed to be separated into a plurality of component layers (typically, one to three layers) depending on presence or absence of centrifugal separation. A measurement target is a portion that is an analysis target (that is a dispensing target) by a biochemical analyzer or the like such as plasma or serum of a specimen separated into a plurality of layers.

Figure 1:
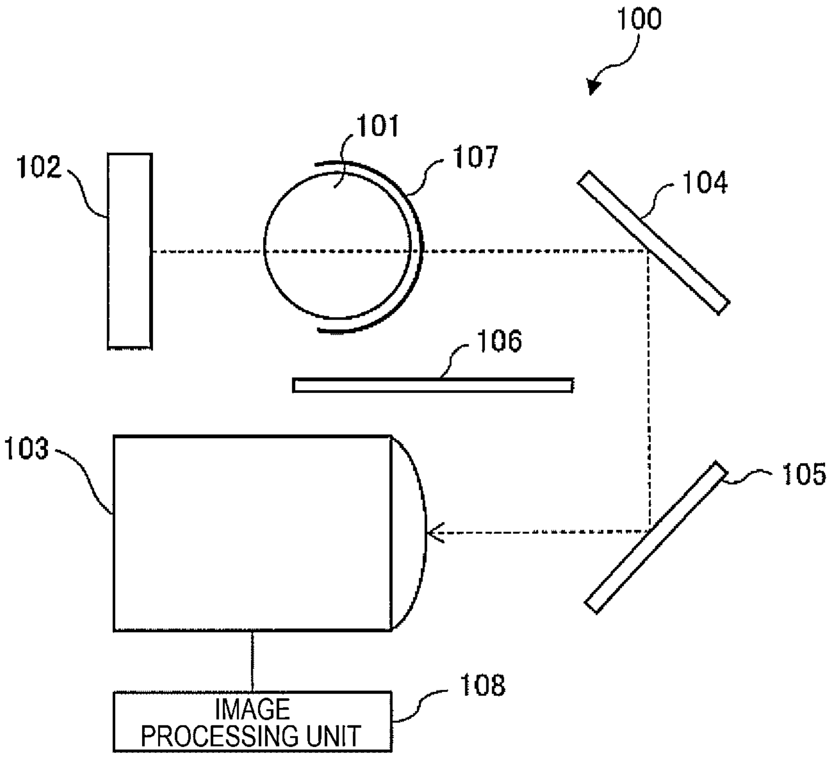
FIG. 1 is a plan view showing a configuration of a biological sample measuring device 100 according to Embodiment 1.

FIG. 1 is a plan view showing a configuration of a biological sample measuring device 100 according to Embodiment 1 of the present disclosure. The biological sample measuring device 100 is a device that measures a biological sample 101. The biological sample 101 is a sample configured as described above. The biological sample measuring device 100 specifies a measurement target region of the biological sample 101, and measures a liquid amount thereof. The biological sample measuring device 100 includes a surface illumination light source 102, an area camera 103, a first mirror 104, a second mirror 105, an absorber 106, and an image processing unit 108.

The surface illumination light source 102 switches a wavelength of emitted light between two wavelengths, and illuminates the biological sample 101 with the light. The light emitted from the surface illumination light source 102 can simultaneously illuminate two or more component layers (that is, across two or more component layers) that constitute the biological sample 101. Further, regardless of the component layer, an upper surface of an uppermost layer (a boundary between the sample and an air layer) can be radiated. Switching a wavelength of light does not necessarily require emitting light having only a single wavelength, and it is sufficient that a wavelength component having a highest intensity can be switched (wavelength $\lambda 1=1550\pm100$ nm, wavelength $\lambda 2=970\pm100$ nm, or the like). In the biological sample 101 having one or three component layers, when the number of the component layers is known before measurement, it is sufficient to use either of the two wavelengths, and there is no need to switch a wavelength. A reason and a method for selecting a wavelength will be described in a measurement principle to be described later.

The area camera 103 images surface illumination light transmitted through the biological sample 101, thereby generating a two-dimensional captured image of the biological sample 101. The area camera 103 has sensitivity characteristics that can detect light in a wavelength band emitted from the surface illumination light source 102. The area camera 103 can be implemented by, for example, an InGaAs camera.

The first mirror 104 reflects the transmitted light transmitted through the biological sample 101 toward the second mirror 105. The second mirror 105 reflects the transmitted light reflected on the first mirror 104 toward the area camera 103. Accordingly, the transmitted light is reflected twice from transmitted through the biological sample 101 until reaching the area camera 103, and the optical path is refracted twice due to the reflection.

The absorber 106 has characteristics of attenuating a light amount of the transmitted light transmitted through the biological sample 101 by at least partially absorbing the transmitted light transmitted through the biological sample 101. A size and an arrangement of the absorber 106 will be described later.

The image processing unit 108 extracts the measurement target region (an image region of the specimen) from the captured image acquired by the area camera 103. An extraction principle will be described below.

Figure 2A:
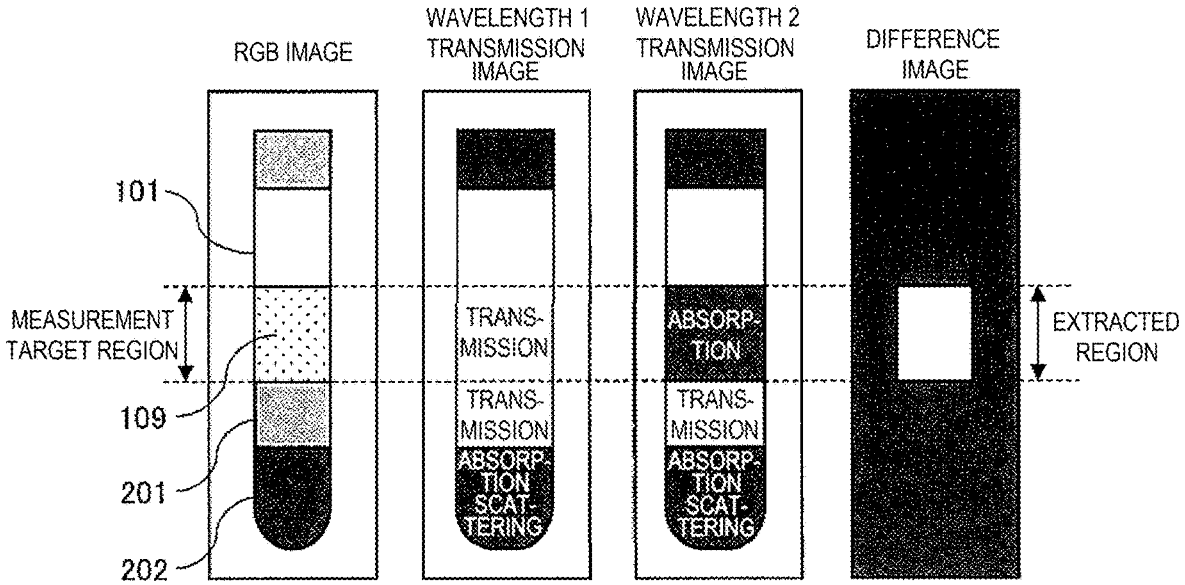
FIG. 2A is a diagram illustrating a principle for specifying a measurement target region.
Figure 2B:
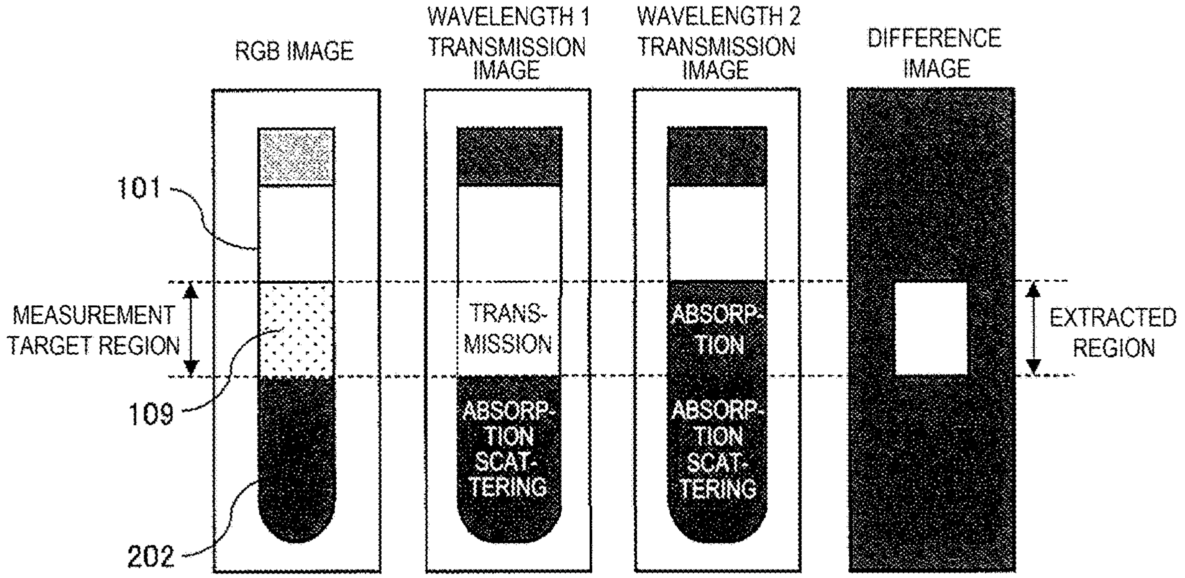
FIG. 2B is a diagram illustrating a principle for specifying the measurement target region.

FIGS. 2A and 2B are diagrams illustrating a principle for specifying the measurement target region. In the configuration in FIG. 1, the area camera 103 captures a two-dimensional transmission image of the biological sample 101 as shown in FIGS. 2A and 2B.

FIG. 2A shows an example in which the biological sample 101 is separated into three layers. FIG. 2B shows an example in which the biological sample 101 is separated into two layers. A blood clot 202 is formed at a lower layer when the biological sample 101 is centrifugally separated. A separating agent 201 is mixed to separate the blood clot 202 from the measurement target region 109.

When a first wavelength (wavelength 1) and a second wavelength (wavelength 2) emitted from the surface illumination light source 102 are compared, a transmittance when the wavelength 1 is transmitted through the blood clot 202 and a transmittance when the wavelength 2 is transmitted through the blood clot 202 are substantially the same. Therefore, a difference between a captured image of the blood clot 202 acquired using the wavelength 1 and a captured image of the blood clot 202 acquired using the wavelength 2 is very small. Similarly, for the separating agent 201, since the transmittance of the wavelength 1 and the transmittance of the wavelength 2 are substantially the same, a difference between the two images is very small.

In contrast, a transmittance when the wavelength 1 is transmitted through the measurement target region 109 and a transmittance when the wavelength 2 is transmitted through the measurement target region 109 are greatly different. Therefore, a difference between a captured image of the measurement target region 109 acquired using the wavelength 1 and a captured image of the measurement target region 109 acquired using the wavelength 2 is remarkable. The difference is identified, whereby the measurement target region 109 can be extracted from the captured images.

Wavelength bands adopted as the wavelength 1 and the wavelength 2 need to be selected in advance such that a remarkable difference is generated between the wavelengths in the measurement target region 109, but almost no difference is generated in other portions as exemplified in FIGS. 2A and 2B. As long as the condition is satisfied, a specific numerical value of a wavelength may be optional. That is, at least a difference between the transmittance when the wavelength 1 is transmitted through the measurement target region 109 and the transmittance when the wavelength 2 is transmitted through the measurement target region 109 just needs to be larger than a difference between a transmittance when the wavelength 1 is transmitted through a region other than the measurement target region 109 and a transmittance when the wavelength 2 is transmitted through a region other than the measurement target region 109.

By using the measurement principle described above, when the biological sample 101 is separated into a plurality of component layers, the measurement target region 109 can be specified. The image processing unit 108 specifies the measurement target region 109 according to the principle. Although the number of component layers does not matter, a typical biological sample such as plasma or serum is separated into one to three layers. In either case, the measurement target region 109 can be accurately specified.

Regarding the biological sample 101 having one component layer and the biological sample 101 having three component layers, when the number of component layers is known in advance before the measurement, measurement can be performed using a transmission image having only one wavelength. In a case of three layers as shown in FIG. 2A, a wavelength having a difference in an absorptance between the air layer and the separating agent 201 located above and below the measurement target region 109 and the measurement target region 109 may be selected. In a case of one layer, a wavelength having a difference between the air layer above the measurement target region 109 and an absorptance of the measurement target region 109 may be selected.

Figure 3A:
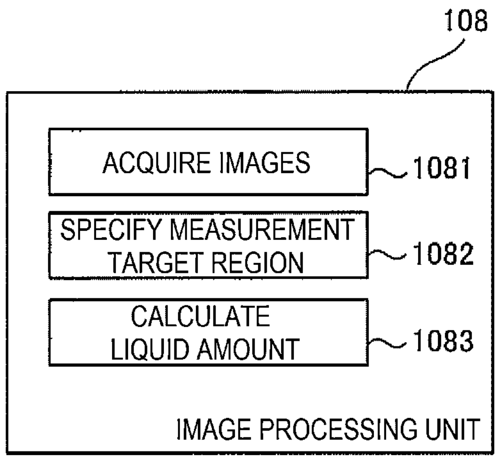
FIG. 3A shows a configuration of an image processing unit 108.

FIG. 3A shows a configuration of the image processing unit 108. The image processing unit 108 analyzes a captured image having each wavelength acquired by the area camera 103. The image processing unit 108 includes an image acquisition unit 1081, a measurement target region specifying unit 1082, and a liquid amount calculation unit 1083. The image acquisition unit 1081 acquires transmission images having two wavelengths captured by the area camera 103. The measurement target region specifying unit 1082 specifies the measurement target region 109 by comparing the captured images having the wavelengths. The liquid amount calculation unit 1083 calculates a liquid amount in the measurement target region 109.

Figure 3B:
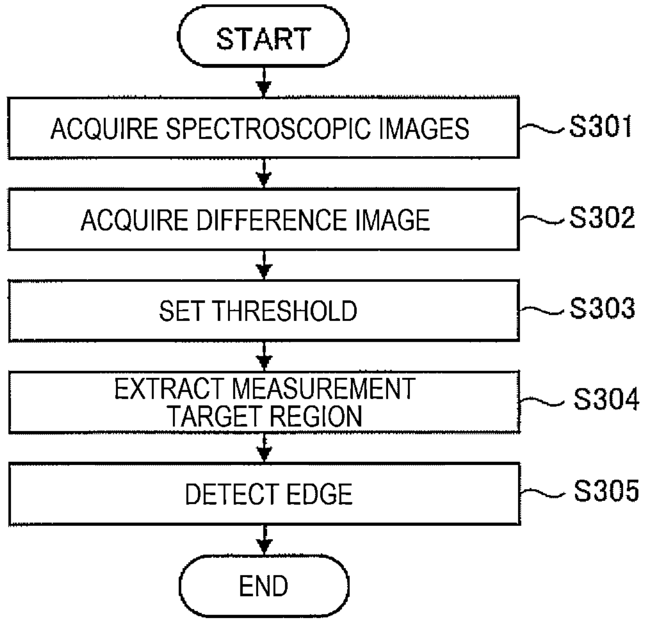
FIG. 3B is a flowchart illustrating an example of processing of specifying a measurement target region 109 from transmission images and calculating a liquid amount thereof by the image processing unit 108.

FIG. 3B is a flowchart illustrating an example of processing of specifying the measurement target region 109 from the transmission images and calculating a liquid amount thereof by the image processing unit 108. Hereinafter, steps in FIG. 3B will be described.

(FIG. 3B: Step S301)

The measurement target region specifying unit 1082 acquires the captured images at the wavelength 1 and the wavelength 2. In the present flowchart, since it is sufficient that the measurement target region 109 can be specified according to the procedure illustrated in FIGS. 2A and 2B, exposure time may use, for example, a value predetermined as a specified value.

(FIG. 3B: Step S302)

The measurement target region specifying unit 1082 calculates a difference image between the captured image at the wavelength 1 and the captured image at the wavelength 2. In the present step, the difference image illustrated in FIGS. 2A and 2B is calculated, and the difference image can be acquired by calculating a difference in pixel values of the images. Examples of a calculation procedure include the following: (a) wavelength 1 image−wavelength 2 image; (b) wavelength 2 image−wavelength 1 image; and (c) (wavelength 1 image−wavelength 2 image)/(wavelength 1 image+wavelength 2 image).

(FIG. 3B: Step S302: Supplement)

In a case where the number of component layers of the biological sample 101 is one or three, when a transmission image having one wavelength is analyzed without switching the wavelength, the present step is omitted, and a boundary of each layer is specified using processing such as edge detection in S305.

(FIG. 3B: Step S303)

The measurement target region specifying unit 1082 sets a threshold for detecting the measurement target region 109. The threshold can be set as, for example, a pixel value=0, or an appropriate threshold may be set for each sample.

(FIG. 3B: Step S304)

The measurement target region specifying unit 1082 extracts, as the measurement target region 109, a portion of the difference image whose pixel value is equal to or larger than the threshold.

(FIG. 3B: Step S305: Part 1)

The measurement target region specifying unit 1082 detects an edge (height) of the measurement target region 109. As an edge detection method, for example, the following can be used: (a) an edge detection algorithm based on a luminance gradient (inclination), a differential value, or the like in a vertical direction; (b) pixel values of the extracted measurement target region 109 are integrated in a horizontal direction to be one-dimensional, and an edge in a perpendicular direction is specified using a signal inclination, a differential value, a variance value, or the like in the perpendicular direction. A specification result can be stored as coordinate values on a captured image. That is, statistics of the pixel values in the horizontal direction are calculated as feature values in the horizontal direction, and the feature values are compared along the vertical direction, whereby upper and lower edges of the measurement target region 109 can be specified.

(FIG. 3B: Step S305: Part 2)

The liquid amount calculation unit 1083 can calculate a liquid amount in the measurement target region 109 by using a result in the present step. For example, after boundaries of the layers are specified, a liquid amount in a corresponding region is calculated using information on a pixel pitch, the number of extracted pixels, and an inner diameter of a container of the biological sample 101.

Figure 4:
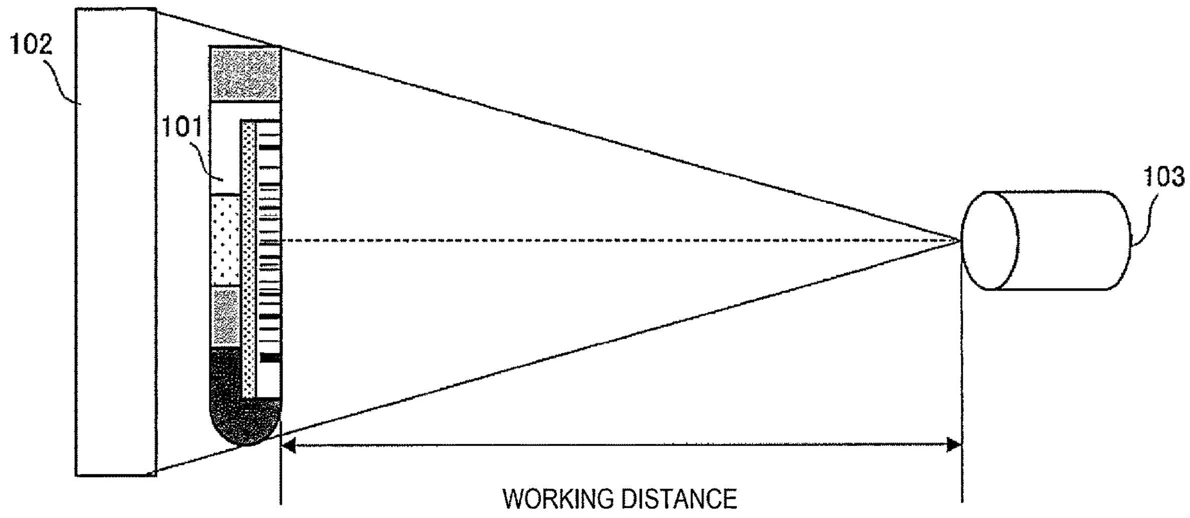
FIG. 4 is a diagram illustrating a working distance of an area camera 103.

FIG. 4 is a diagram illustrating a working distance of the area camera 103. In order to measure a liquid amount based on the transmission image of the biological sample 101 as shown in FIG. 2, it is necessary to secure a field of view in a longitudinal direction capable of imaging the boundaries of the layers of the biological sample 101. For that purpose, it is necessary to sufficiently secure the working distance (a distance from the biological sample 101 to a lens of the area camera 103).

The necessary working distance is obtained using a focal length of the lens, a necessary field of view, and a sensor size. When the necessary field of view is 100 mm that is a length of a blood collection tube (specimen container), the focal length is 8 mm, and the sensor size is 6.4 mm (long side), the working distance is 125 m. That is, in order to image the entire biological sample, it is necessary to dispose the biological sample 101 and the area camera 103 by a distance of 125 mm.

In FIG. 1, the optical path of the transmitted light is folded back by using the two mirrors. The configuration in which the optical path is refracted is adopted as described above, whereby a sufficient working distance can be secured while reducing an area size of the biological sample measuring device 100. Further, a size of the biological sample measuring device 100 can be changed according to an application by an arrangement of the mirrors.

It is desirable that the surface illumination light source 102 has a size of a region sandwiched by lines that connect an outermost shape of the biological sample 101 to a center of the area camera 103. Therefore, it is desirable that a size of the surface illumination light source 102 in an upper-lower direction in the drawing in FIG. 4 secures the size of the region sandwiched by the lines that connect the outermost shape shown in FIG. 4. For example, when the working distance is 125 mm, the length of the blood collection tube is 100 mm, and a distance between the illuminator and the area camera is 150 mm, it is desirable that a height (the size in the upper-lower direction in the drawing in FIG. 4) of the surface illumination light source 102 is 120 mm based on a similarity relationship of a triangle.

Figure 5A:
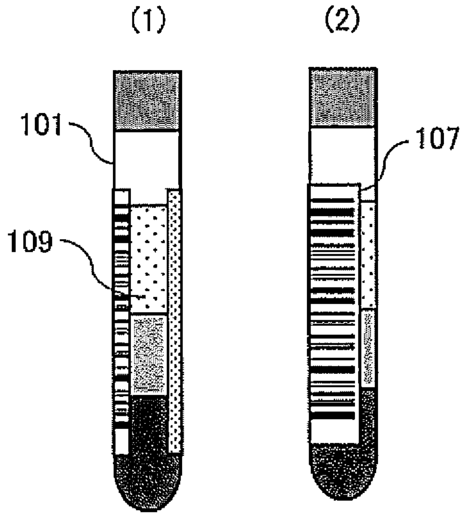
FIG. 5A shows an example in which a label 107 is attached to a container of a biological sample 101.
Figure 5B:
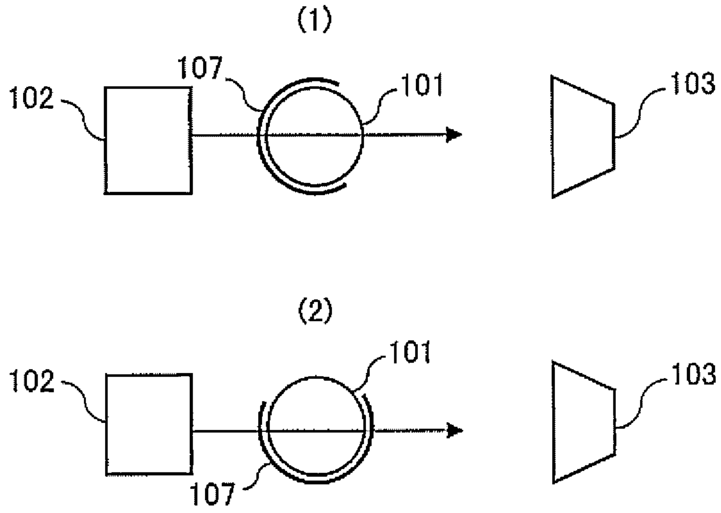
FIG. 5B shows an example in which the label 107 is attached to the container of the biological sample 101.

FIGS. 5A and 5B show an example in which a label 107 is attached to a container of the biological sample 101. FIG. 5A is a side view of the container, and FIG. 5B is a top view thereof. A barcode label, a pre-label, or the like may be attached to the container (for example, a blood collection tube) of the biological sample 101. Even in such a case, it is required to accurately specify the measurement target region 109.

When a mechanism that controls an orientation of the biological sample 101 is not provided, there are a case where the label is on an illuminator side ((1) in FIG. 5B) and a case where the label is on a side opposite to the illuminator ((2) in FIG. 5B). In either case, it is required to specify the measurement target region with the same accuracy.

Figure 6A:
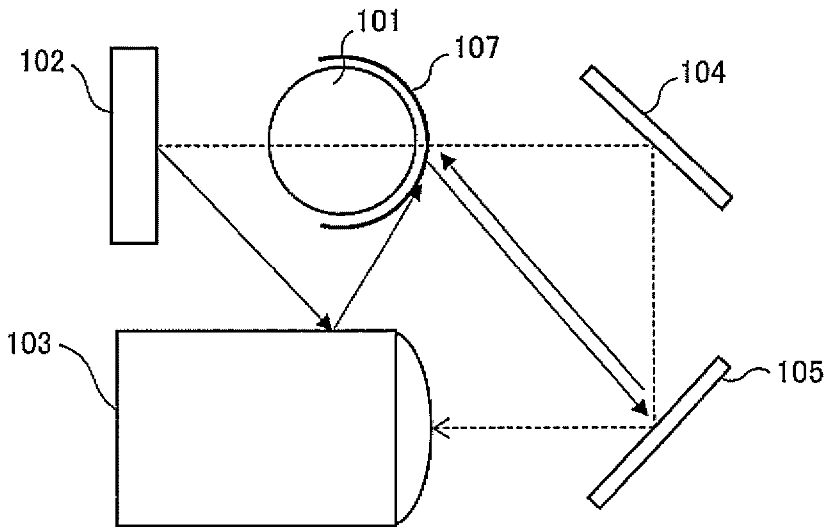
FIG. 6A is a diagram illustrating a problem related to re-illumination.
Figure 6B:
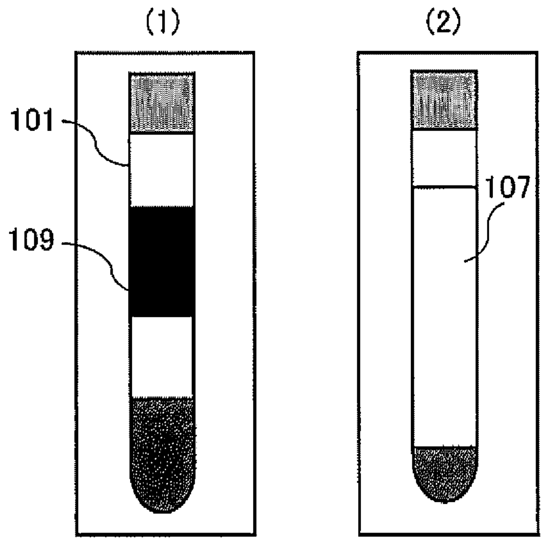
FIG. 6B is a diagram illustrating a problem related to the re-illumination.

FIGS. 6A and 6B are diagrams illustrating a problem related to re-illumination. Under the condition of the label as shown in FIG. 5, a problem related to re-illumination of the transmitted light occurs. When miniaturization is implemented by using the two mirrors as shown in FIG. 1, light scattered and transmitted from the biological sample 101 is reflected on the second mirror 105, and re-illumination light that illuminates a sample surface on a side opposite to the surface illumination light source 102 is generated via an optical path as indicated by solid lines in FIG. 6A.

At this time, as shown in (1) in FIG. 5B, when the label 107 is on the illuminator side and the label 107 is not on a first mirror 104 side, a transmission image as shown in (1) in FIG. 6B is obtained. Under such a condition, a boundary contrast sufficient for specifying the measurement target region is obtained. On the other hand, when the label 107 is on the first mirror 104 side as shown in (2) in FIG. 5B, the re-illumination light is reflected on the label 107, and both the transmitted light of the biological sample 101 and the reflected light of the label 107 are imaged. In a case of the label 107 having high reflectivity such as white, when there is light that reflects the label 107, a label image is obtained as shown in (2) in FIG. 6B. Such reflected light of the label 107 reduces contrast of the transmitted light necessary for specifying the measurement target region 109.

A similar problem related to the re-illumination also occurs, when the surface illumination light source 102 directly radiates the area camera 103 (an arrow directed from the surface illumination light source 102 toward the area camera 103 in FIG. 6A) and light reflected on the area camera 103 illuminates the biological sample 101 (an arrow directed from the area camera 103 toward the biological sample 101 in FIG. 6A).

As described above, even for the same biological sample 101, images obtained when an orientation of the biological sample 101 (an orientation of the label 107) is changed are different. Further, when a reduction in the contrast due to the re-illumination light is remarkable, accuracy of specifying the measurement target region 109 decreases. That is, analysis accuracy decreases depending on an orientation of the biological sample 101. In order to solve such a problem, the size and the arrangement of the absorber 106 are implemented as follows in present Embodiment 1.

Figure 7A:
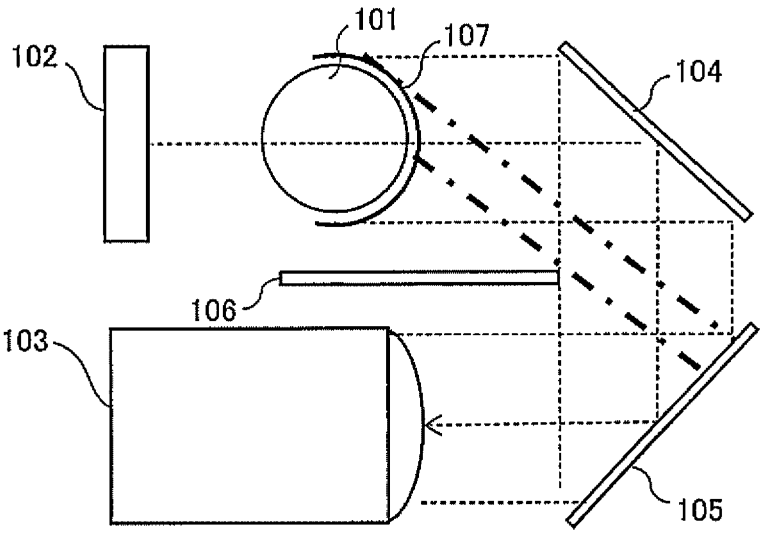
FIG. 7A is a diagram showing re-illumination light from a second mirror 105.

FIG. 7A is a diagram showing re-illumination light from the second mirror 105. A dotted line indicates an optical path of effective light flux necessary for acquiring an image of the biological sample 101 by the area camera 103. A one-dot chain line indicates a line where a normal line of the second mirror 105 overlaps the biological sample 101. When a path of the one-dot chain line is valid (that is, the transmitted light can reach the biological sample 101 via the path), light scattered on the label 107 is reflected on the second mirror 105, and re-illumination light that re-illuminates the label 107 is generated.

Figure 7B:
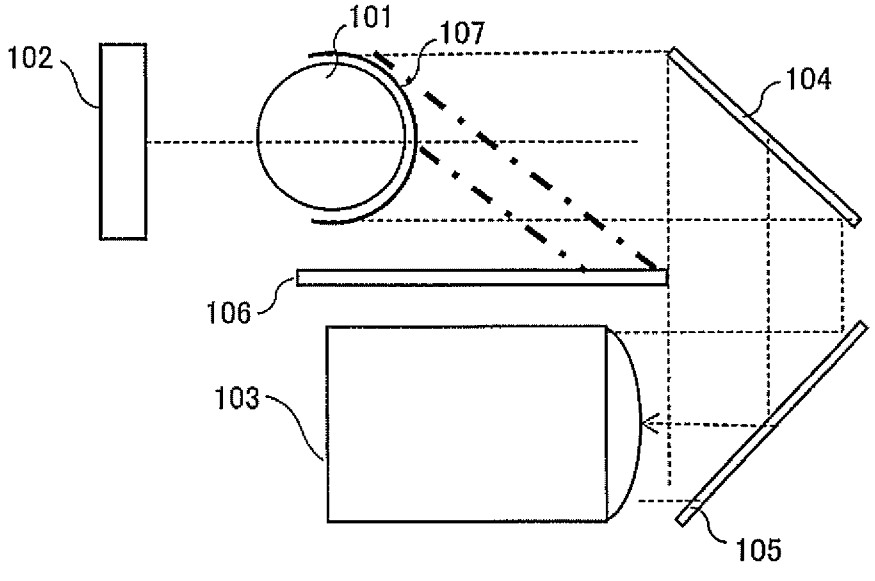
FIG. 7B is a diagram illustrating a method for preventing the re-illumination light from the second mirror 105.

FIG. 7B is a diagram illustrating a method for preventing the re-illumination light from the second mirror 105. As described above, since the working distance is determined based on the field of view necessary for analysis, the sensor size of the area camera 103, and the focal length of the lens, it is not possible to prevent the re-illumination light by changing a distance between the area camera 103 and the biological sample 101. Therefore, while maintaining the working distance, the first mirror 104 and the second mirror 105 are separated from the biological sample 101, and an interval between the area camera 103 and the second mirror 105 is shortened. Accordingly, an arrangement relationship as shown in FIG. 7B is established while maintaining the working distance.

In FIG. 7B, the absorber 106 blocks the re-illumination light by disposing the absorber 106 on the optical path indicated by the one-dot chain line. That is, the size and the arrangement position of the absorber 106 block the transmitted light reflected on the second mirror 105 from re-illuminating the biological sample 101 (more specifically, the label 107). Accordingly, it is possible to solve the problem of the re-illumination described in FIG. 6A.

It is desirable that the absorber 106 does not block the transmitted light reflected from the first mirror 104 toward the second mirror 105. In FIG. 7B, the absorber 106 is disposed such that a right end of the absorber 106 does not overlap a straight line that connects a left end of the first mirror 104 to a left end of the second mirror 105. Accordingly, the absorber 106 can block only the path of the re-illumination light indicated by the one-dot chain line without obstructing the path of the effective light flux indicated by the dotted line.

The arrangement in FIG. 7B also has the following advantages. In a related-art arrangement relationship between the surface illumination light source 102 and the area camera 103 as shown in FIG. 4, since wiring that supplies power to the surface illumination light source 102 extends to a left side of the drawing, and wiring that supplies the power to the area camera 103 extends to a right side of the drawing, a size of a space for housing the wiring is increased. In contrast, in the arrangement relationship in FIG. 7B, since either wiring extends to a left side of the drawing, it is possible to reduce the size of the space for housing the wiring. In other words, it is desirable that the surface illumination light source 102 and the area camera 103 are disposed such that a direction in which the surface illumination light source 102 emits light and a direction of light when the area camera 103 receives light are parallel to each other, and face the same orientation.

Figure 8:
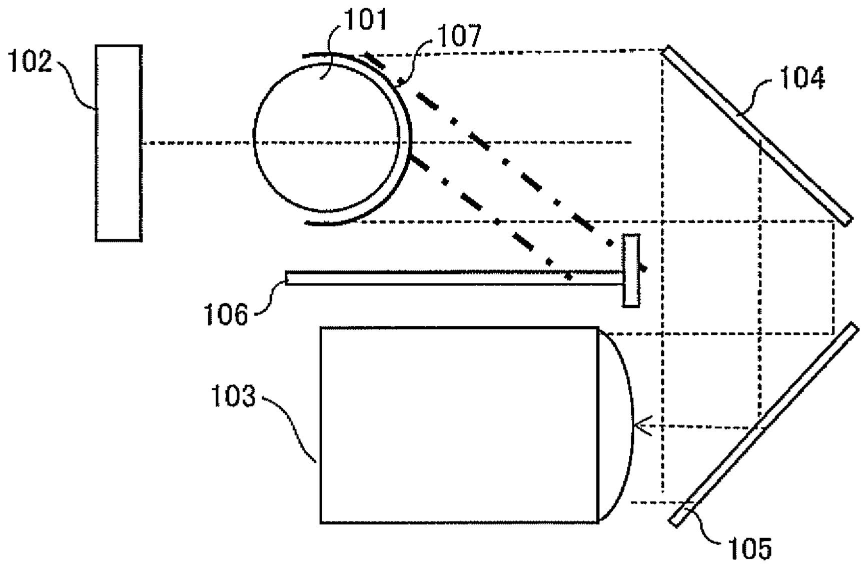
FIG. 8 shows a modification of an absorber 106.

FIG. 8 shows a modification of the absorber 106. The shape of the absorber 106 does not necessarily have to be planar. For example, the absorber 106 may have a bent shape obtained by being refracted at one or more locations as shown in FIG. 8 (that is, two or more portions that block the optical path indicated by the one-dot chain line may be provided). When the absorber 106 is bent, it is easier to create an interval between the path of the effective light flux indicated by the dotted line and the absorber 106. This is because even if the interval is created, it is sufficient that at least one of the bent portions blocks the one-dot chain line. Accordingly, effects of facilitating product design in consideration of a positional deviation of a component are obtained.

Figure 9:
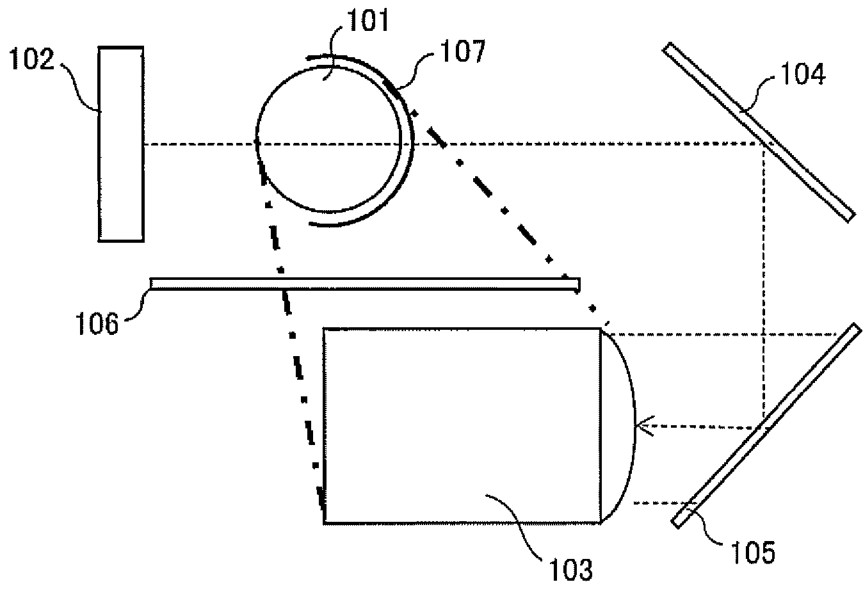
FIG. 9 is a diagram showing that scattered light from the label 107 is reflected on the area camera 103 and re-illuminates the biological sample 101.

FIG. 9 is a diagram showing that scattered light from the label 107 is reflected on the area camera 103 and re-illuminates the biological sample 101. A one-dot chain line indicates a path that connects the outermost shape of the biological sample 101 and an outermost shape of the area camera 103 to each other. When the path is valid (that is, the scattered light from the label 107 can be reflected on the area camera 103, and can reach the biological sample 101 via the path), the light scattered on the label 107 re-illuminates the biological sample 101. The absorber 106 may obstruct the path.

Specifically, the absorber 106 may block a region sandwiched by (a) a tangent line (a one-dot chain line on a left side) in contact with both a left side surface (first side surface) of the biological sample 101 (specimen container) and a left side surface (second side surface) of the area camera 103 and (b) a tangent line (a one-dot chain line on a right side) in contact with both a right side surface (third side surface) of the biological sample 101 and a right side surface (fourth side surface) of the area camera 103 in FIG. 9.

Figure 10:
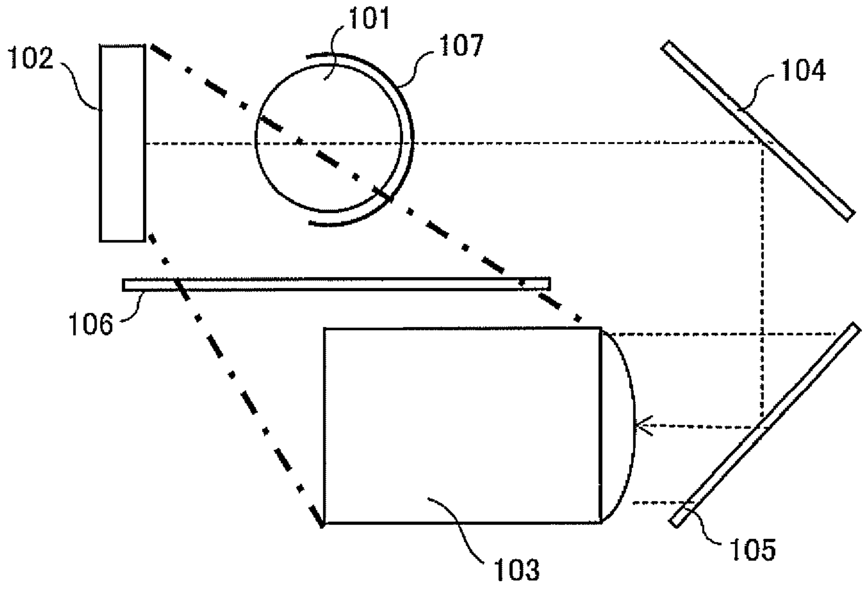
FIG. 10 is a diagram showing that illumination light from a surface illumination light source 102 is reflected on the area camera 103 and re-illuminates the biological sample 101.

FIG. 10 is a diagram showing that illumination light from the surface illumination light source 102 is reflected on the area camera 103, and re-illuminates the biological sample 101. A one-dot chain line indicates a path that connects both ends of a light-emitting surface of the surface illumination light source 102 and the outermost shape of the area camera 103 to each other. When the path is valid (that is, the illumination light from the surface illumination light source 102 can be directly incident on the area camera 103), the illumination light reflected on the area camera 103 may re-illuminate the biological sample 101.

Since the reflected light has a light amount larger than that of light scattered on the absorber 106, it is desirable that the absorber 106 is also provided on the path. When the path indicated by the one-dot chain line in FIG. 9 can be blocked, the biological sample 101 is not re-illuminated by the illumination light in FIG. 10, but reflection may be performed a plurality of times by a mechanism component that holds an optical component, and the label 107 may be re-illuminated. The path indicated by the one-dot chain line in FIG. 10 is completely eliminated, whereby it is also possible to prevent such a path on which the reflection is performed a plurality of times.

Specifically, the absorber 106 may block a region sandwiched by (a) a tangent line (a one-dot chain line on a left side) in contact with both one end of the light-emitting surface of the surface illumination light source 102 and a left side surface (fifth side surface) of the area camera 103 and (b) a tangent line (a one-dot chain line on a right side) in contact with both the other end of the light-emitting surface of the surface illumination light source 102 and a right side surface (sixth side surface) of the area camera 103 in FIG. 10.

Figure 11A:
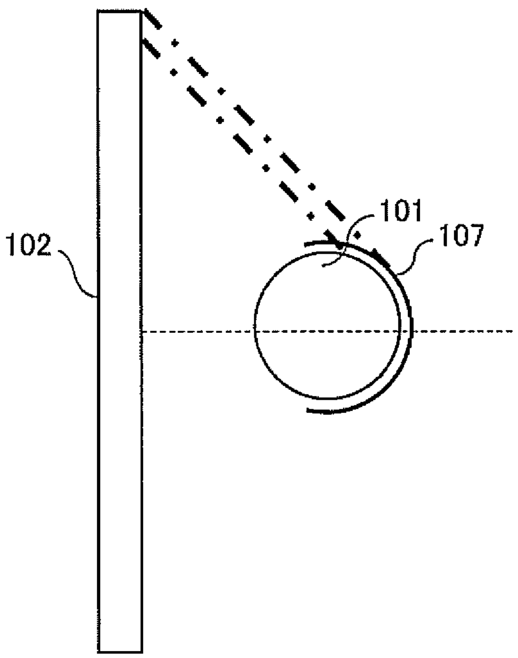
FIG. 11A is a diagram showing that the surface illumination light source 102 directly illuminates a location where transmitted light is emitted.

FIG. 11A is a diagram illustrating that the surface illumination light source 102 directly illuminates a location where the transmitted light is emitted. When the light-emitting surface of the surface illumination light source 102 is large, a region on the biological sample 101 to be imaged by the area camera 103 is directly illuminated by the surface illumination light source 102. That is, a location where the transmitted light from the biological sample 101 is emitted from the biological sample 101 is directly illuminated by the surface illumination light source 102. A one-dot chain line indicates a path of such direct illumination. Like the re-illumination light, the path also causes a reduction in the contrast of the measurement target region 109.

Figure 11B:
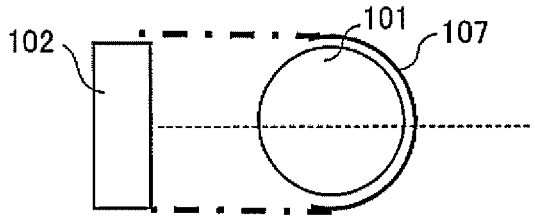
FIG. 11B is a diagram illustrating a method for preventing the surface illumination light source 102 from directly illuminating an imaging range.

FIG. 11B is a diagram illustrating a method for preventing the surface illumination light source 102 from directly illuminating an imaging range. When the light-emitting surface of the surface illumination light source 102 has a size the same as that of the biological sample 101, it is possible to prevent the region on the biological sample 101 to be imaged by the area camera 103 from being directly illuminated. Therefore, it is desirable that the light-emitting surface of the surface illumination light source 102 has a size equivalent to that of the biological sample 101.

However, in consideration of a positional deviation of a component, the light-emitting surface of the surface illumination light source 102 may be made larger than the biological sample 101 by the positional deviation. In this case, since the light-emitting surface is slightly larger than the biological sample 101 as shown in FIG. 11B, a direct illumination path similar to that indicated by the one-dot chain line in FIG. 11A may be generated. Therefore, it is desirable to take measures such as making the size of the light-emitting surface slightly larger than the biological sample 101 in consideration of the positional deviation of the component, and having the image processing unit 108 analyze a captured image only in a range of an image captured by the area camera 103 where the direct illumination light does not enter.

On the other hand, for a planar size (a size in an upper-lower direction in FIG. 11A, or a size in a depth direction in FIG. 4) of the light-emitting surface of the surface illumination light source 102, a certain size is required. Specifically, as described in FIG. 4, it is desirable that the region sandwiched by the lines that connect the outermost shape of the biological sample 101 to the center of the area camera 103 has a certain size. For example, when the working distance is 1 mm, the width of the specimen container is 16 mm, and the distance from the surface illumination light source 102 to the area camera 103 is 150 mm, the planar size of the light-emitting surface is 19.2 mm based on the similarity relationship of the triangle.

As shown in FIG. 11A, since the direct illumination light hits an edge of the specimen container when the light-emitting surface is larger than the specimen container, the portion is excluded from the analysis range of the image processing unit 108. Accordingly, a width of the light-emitting surface can be set at 19.2 mm as calculated above.

Therefore, it is possible to achieve both necessary sizes of the light-emitting surface from viewpoints of the working distance and preventing the direct illumination light. When the area camera 103 having a working distance of 125 mm is assumed as described above, it can be said that it is best to set an outer shape of the light-emitting surface at about 120×19.2 mm.

Embodiment 1: Summary

The biological sample measuring device 100 according to present Embodiment 1 images the transmitted light transmitted through the biological sample 101 by the area camera 103 (a camera that captures a two-dimensional image of the biological sample 101), and further includes the first mirror 104 and the second mirror 105 that refract the transmitted light to guide the transmitted light to the area camera 103. An optical system using the area camera 103 can eliminate a need for a large-sized mechanism such as scanning the biological sample 101 in a vertical direction. Further, the optical system using the two mirrors can improve a degree of freedom in designing the size and the wiring direction of the biological sample measuring device 100 while maintaining the working distance. Accordingly, the biological sample measuring device 100 can be miniaturized. For example, the biological sample measuring device 100 can be additionally mounted as an option on a product such as an existing centrifuge. Of course, the biological sample measuring device 100 is not only optionally mounted, but also can be used as an independent device.

In the biological sample measuring device 100 according to present Embodiment 1, (a) the light reflected on the second mirror 105 and directed toward the biological sample 101, (b) the light scattered from the biological sample 101, incident on the area camera 103, reflected on the area camera 103, and returned to the biological sample 101, (c) the light radiated directly from the surface illumination light source 102 to the area camera 103, reflected on the area camera 103, and directed toward the biological sample 101, and the like are blocked by the absorber 106. Accordingly, it is possible to prevent the image contrast of the measurement target region 109 from decreasing due to the re-illumination. Particularly, the prevention effects can be remarkably exhibited in the biological sample 101 to which the label 107 is attached.

Embodiment 2

Figure 12:
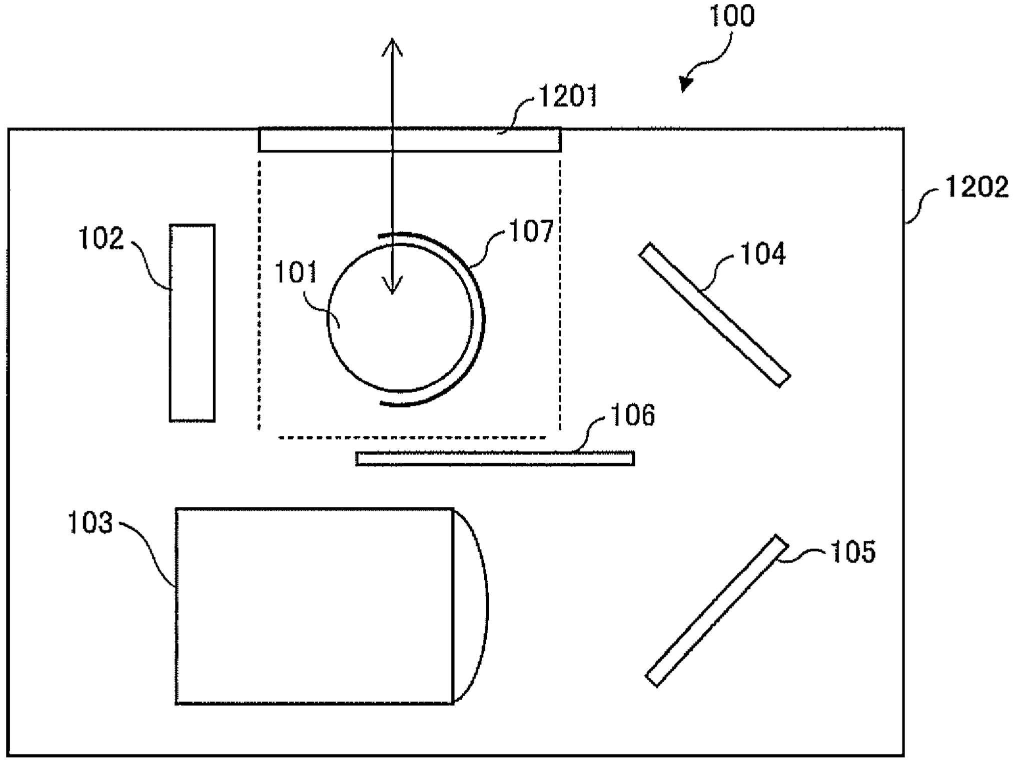
FIG. 12 is a plan view showing a configuration of the biological sample measuring device 100 according to Embodiment 2.

FIG. 12 is a plan view showing a configuration of the biological sample measuring device 100 according to Embodiment 2 of the present disclosure. When the configuration described in Embodiment 1 is adopted, the biological sample measuring device 100 can be sufficiently miniaturized, and the biological sample measuring device 100 can be mounted as an additional option on an existing device such as a centrifugal separator. That is, the components of the biological sample measuring device 100 can be mounted inside a relatively small-sized housing 1202. Further, when an arrangement between the first mirror 104 and the second mirror 105 is adjusted, an arrangement and a size of each component of the biological sample measuring device 100 can also be adjusted such that the components can be mounted in the housing 1202.

The biological sample measuring device 100 may include a carry-in port 1201 for introducing the biological sample 101. The arrangement between the first mirror 104 and the second mirror 105 may be changed according to a carry-in path of the biological sample 101.

As the carry-in path, there are a method for taking in and out a specimen by preparing the carry-in port (opening) in a side surface of the device as shown in FIG. 12, a method for taking in and out the specimen from an upper portion by preparing an opening in the upper portion of the device, and the like. As a method for gripping and moving the biological sample 101, there are a method for gripping and moving the biological sample 101 by a gripping mechanism that grips a cap region of a container, a method for placing a container on a holder and moving the container by a belt conveyor system, and the like.

Embodiment 3

Figure 13:
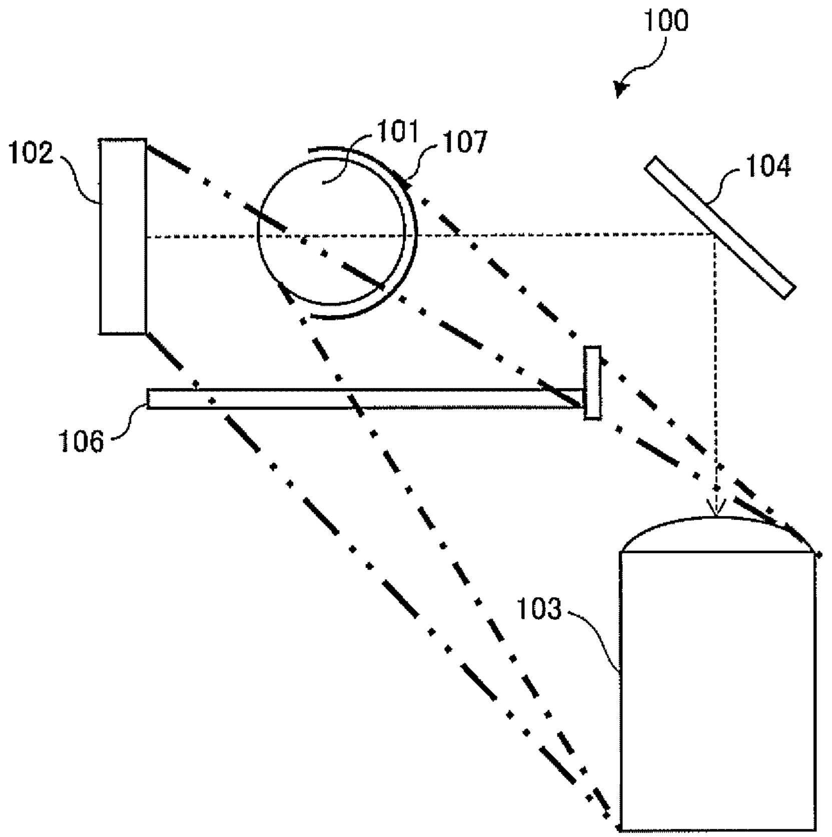
FIG. 13 is a plan view showing a configuration of the biological sample measuring device 100 according to Embodiment 3.

FIG. 13 is a plan view showing a configuration of the biological sample measuring device 100 according to Embodiment 3 of the present disclosure. The biological sample measuring device 100 according to present Embodiment 3 does not include the second mirror 105. Therefore, the first mirror 104 directly reflects the transmitted light toward the area camera 103. A method for specifying the measurement target region 109 is similar to those in Embodiments 1 to 2. Also in present Embodiment 3, it is desirable to block the re-illumination light or the like by the absorber 106.

A one-dot chain line indicates a path on which light scattered on the biological sample 101 illuminates the area camera 103. A two-dot chain line indicates a path on which the surface illumination light source 102 directly illuminates the area camera 103. Both paths are scattered and reflected by the area camera 103, and the biological sample 101 is re-illuminated. Regarding the one-dot chain line, re-illumination light can be blocked by disposing the absorber 106 as described in FIG. 9. Regarding the two-dot chain line, reflected light can be blocked by disposing the absorber 106 as described in FIG. 10.

Also in present Embodiment 3, it is desirable to dispose the absorber 106 such that the absorber 106 does not block effective light flux reflected from the first mirror 104 and directed toward the area camera 103. Therefore, a right end of the absorber 106 in FIG. 13 does not overlap a straight line that connects a left end of the first mirror 104 to a left end of an imaging surface of the area camera 103.

As compared with a case of two mirrors described in Embodiment 1, the biological sample measuring device 100 according to present Embodiment 3 can have a simple configuration. By using one mirror, when compared with a case of two mirrors, the size of the biological sample measuring device 100 becomes larger, but when there is sufficient space, the configuration of present Embodiment 3 is also useful.

Modifications of Present Disclosure

The biological sample measuring device 100 according to the present disclosure can also be mounted as an additional option of an existing device in the existing device as described in Embodiment 2, or the biological sample measuring device 100 can also be used alone.

REFERENCE SIGNS LIST

100: biological sample measuring device
101: biological sample
102: surface illumination light source

103: area camera
104: first mirror
105: second mirror
106: absorber
107: label
108: image processing unit
109: measurement target region
201: separating agent
202: blood clot

The invention claimed is:

1. A biological sample measuring device for measuring a biological sample separated into a plurality of component regions, the biological sample measuring device comprising:

a surface light source configured to radiate light to the biological sample;

an imager configured to generate a two-dimensional captured image of the biological sample using the light transmitted through the biological sample;

a first mirror configured to reflect the light transmitted through the biological sample;

a second mirror configured to reflect the light reflected on the first mirror toward the imager; and an absorber configured to absorb the light, wherein the absorber is disposed at a position where the light is blocked on a reflection path on which the light reflected on the second mirror returns toward the biological sample, and the absorber is disposed at a position where the light reflected from the first mirror toward the second mirror is not obstructed on a path of the light between the first mirror and the second mirror.

2. The biological sample measuring device according to claim 1, wherein the absorber includes a first portion configured to block the light and a second portion configured to block the light by having a bent shape at at least one location.

3. The biological sample measuring device according to claim 1, wherein the absorber is disposed at a position where the light is blocked in at least a first range of a space between the biological sample and the imager, and the first range is a region sandwiched by a first tangent line in contact with a first side surface of a container that houses the biological sample and a second side surface of the imager, and a second tangent line in contact with a third side surface on a side opposite to the first side surface of the container and a fourth side surface on a side opposite to the second side surface of the imager.

4. The biological sample measuring device according to claim 1, wherein the absorber is disposed at a position where the light is blocked in at least a second range of a space between the surface light source and the imager, and the second range is a region sandwiched by a third tangent line in contact with one end of a light-emitting surface of the surface light source and a fifth side surface of the imager, and a fourth tangent line in contact with the other end of the light-emitting surface and a sixth side surface on a side opposite to the fifth side surface of the imager.

5. The biological sample measuring device according to claim 1, further comprising:

an image processing unit configured to specify, from the captured image, a target portion that is a measurement target of the component regions, wherein the surface light source has a light-emitting surface having a size that is relative to a size of the biological sample such that a part of the light transmitted through and emitted from the biological sample is directly illuminated, and the image processing unit specifies the target portion of the captured image without using the part directly illuminated.

6. The biological sample measuring device according to claim 1, further comprising:

an image processing unit configured to specify, from the captured image, a target portion that is a measurement target of the component regions, wherein the imager generates a first captured image of the biological sample using a first wavelength component of the light transmitted through the biological sample, the imager generates a second captured image of the biological sample using a second wavelength component of the light transmitted through the biological sample, the image processing unit calculates a difference between a portion generated using the first wavelength component in the first captured image and a portion generated by the second wavelength component in the second captured image, and the image processing unit specifies a range of the target portion by specifying a portion where the difference is equal to or larger than a threshold.

7. The biological sample measuring device according to claim 1, further comprising:

a carry-in port through which the biological sample is introduced into the biological sample measuring device.

8. The biological sample measuring device according to claim 1, wherein a light-emitting direction of the surface light source and a light-receiving direction of the imager are parallel to each other, and an orientation in which the surface light source emits the light and an orientation of the light when the imager receives the light are opposite to each other.

9. The biological sample measuring device according to claim 1, wherein the biological sample measuring device measures the biological sample housed in a container to which a label is attached.

10. A biological sample measurement method for measuring a biological sample housed in a container to which a label is attached and separated into a plurality of component regions, the biological sample measurement method comprising:

a step of radiating light from a surface illumination light source to the biological sample;

a step of generating a two-dimensional captured image of the biological sample by an imager using the light transmitted through the biological sample;

a step of reflecting the light transmitted through the biological sample by a first mirror;

a step of reflecting the light reflected on the first mirror toward the imager by a second mirror; and a step of absorbing the light by an absorber that absorbs the light, wherein the absorber is disposed at a position where the light is blocked on a reflection path on which the light reflected on the second mirror returns toward the biological sample, and the absorber is disposed at a position where the light reflected from the first mirror toward the second mirror is not obstructed on a path of the light between the first mirror and the second mirror.

11. A biological sample measuring device for measuring a biological sample separated into a plurality of component regions, the biological sample measuring device comprising:

a surface light source configured to radiate light to the biological sample;

an imager configured to generate a two-dimensional captured image of the biological sample using the light transmitted through the biological sample;

a mirror configured to reflect the light transmitted through the biological sample toward the imager; and an absorber configured to absorb the light, wherein the absorber is disposed at a position where the light is blocked on a reflection path on which the light scattered on or transmitted through the biological sample is reflected on the imager and returns toward the biological sample, and the absorber is disposed at a position where the light reflected from the mirror toward the imager is not obstructed on a path of the light between the mirror and the imager.

12. The biological sample measuring device according to claim 11, wherein the absorber is disposed at a position where the light is blocked in at least a first range of a space between the biological sample and the imager, and the first range is a region sandwiched by a first tangent line in contact with a first side surface of a container that houses the biological sample and a second side surface of the imager, and a second tangent line in contact with a third side surface on a side opposite to the first side surface of the container and a fourth side surface on a side opposite to the second side surface of the imager.

13. The biological sample measuring device according to claim 11, wherein the absorber is disposed at a position where the light is blocked in at least a second range of a space between the surface light source and the imager, and the second range is a region sandwiched by a third tangent line in contact with one end of a light-emitting surface of the surface light source and a fifth side surface of the imager, and a fourth tangent line in contact with the other end of the light-emitting surface and a sixth side surface on a side opposite to the fifth side surface of the imager.

* * * * *